United States Patent [19]
Nijenhuis et al.

[11] 3,952,153
[45] Apr. 20, 1976

[54] DOT MATRIX PRINTER HAVING SELECTIVELY ACTUATED PRINTED BARS

[75] Inventors: Emil Johan Nijenhuis, Voorburg; Cornelis Kramer, Leidschendam, both of Netherlands

[73] Assignee: De Staat der Nederlanden, ten dezen Vertegenwoordigd Door de Directeur-Generaal der Posterijen, Telegrafie en Telefonie, The Hague, Netherlands

[22] Filed: Sept. 27, 1974

[21] Appl. No.: 509,845

[30] Foreign Application Priority Data
Oct. 1, 1973  Netherlands.................. 7313483
July 12, 1974  Netherlands.................. 7409464

[52] U.S. Cl............................. 178/30; 101/93.04; 178/33 R
[51] Int. Cl.²........................................ H04L 21/00
[58] Field of Search............... 178/30, 27, 33 R; 346/78; 101/93.04

[56] References Cited
UNITED STATES PATENTS

| | | | |
|---|---|---|---|
| 2,895,337 | 7/1959 | Moring, Jr. et al. | 178/33 R |
| 2,976,801 | 3/1961 | Dirks | 178/30 |
| 3,157,456 | 11/1964 | Kikuchi | 178/30 |
| 3,330,208 | 7/1967 | Eckel | 101/93.04 |
| 3,444,975 | 5/1969 | Simshauser | 101/93.04 |

Primary Examiner—Thomas A. Robinson

[57] ABSTRACT

Remotely controlled electric printer, to which each character to be printed is applied as $m$ groups of $n$ bits, comprising a set of $n$ rulers or print bars, the total thickness of which is equal to the height of said character or a line thereof, each character having a width of $m$ bits. Electromagnetic means are provided capable of shifting the print bars transversely with respect to one another, and there is a cross bridge or anvil that can be moved along said bars. Paper or some other printing carrier is provided between the cross bridge anvil and the bars. The electromagnetic means are so arranged that they can shift the rulers or bars transversely with respect to one another in accordance with the n-bit groups so that the rulers thereby strike the paper against the cross bridge anvil.

This anvil is stepped along the line in $m$ equal steps for each character by a pawl and rack mechanism which also is operated electromagnetically by a separate electromagnetic means.

7 Claims, 10 Drawing Figures

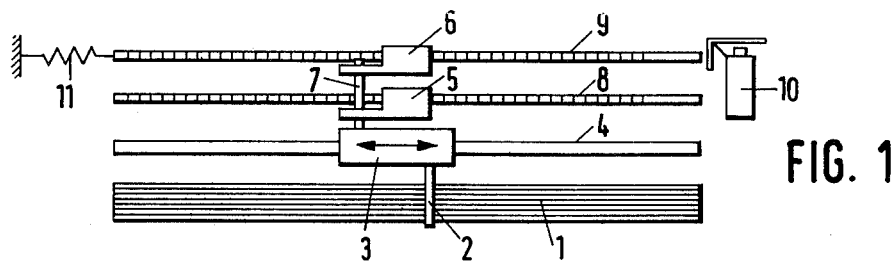
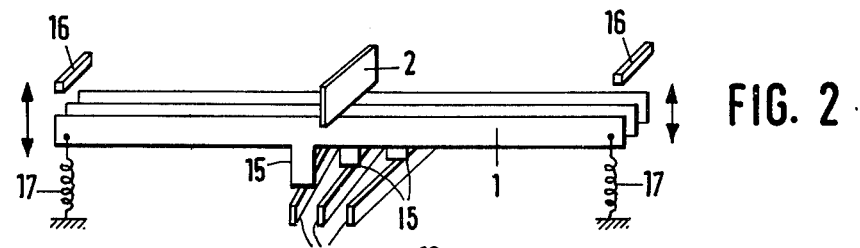
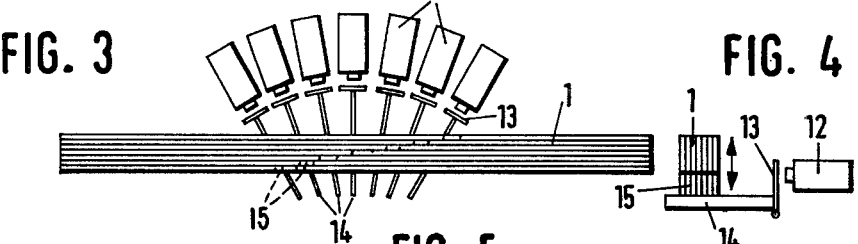
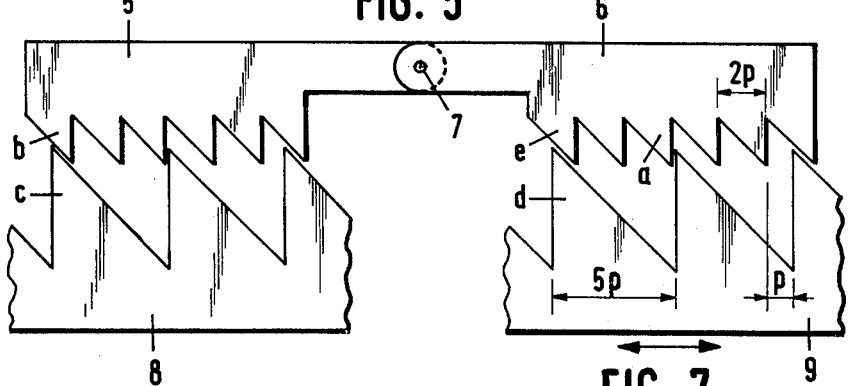
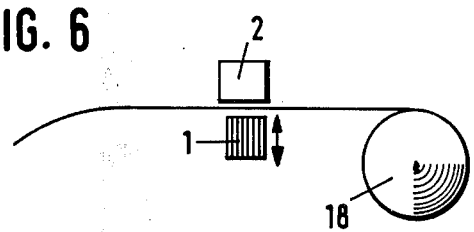
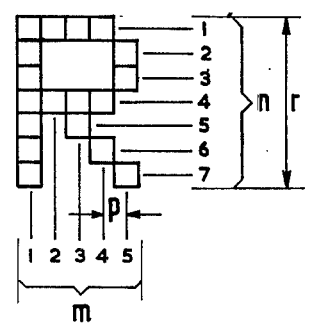

DOT MATRIX PRINTER HAVING SELECTIVELY ACTUATED PRINTED BARS

BACKGROUND OF THE INVENTION

The invention relates to a remotely controlled electric printer, to which each character to be printed is applied as $m$ groups of $n$ bits, comprising a set of $n$ rulers or print bars, the total thickness of which bars is equal to the height of the line. There are electromagnetic means capable of shifting the bars transversely with respect to one another. A cross bridge is moved along these bars in $m$ steps per character by another electromagnetic means. Paper or some other printing carrier is provided between the cross bridge and the bars so that the transverse movement of the bars presses the paper against the cross bridge to mark spots on the paper.

In a well-known device of the above-mentioned type the rulers or print bars are moved lengthwise with respect to one another in such a manner that projections on the rulers form the character to be printed, after which the cross bridge or anvil moves across this character pattern in $m$ consecutive steps, effecting an impression by striking against the paper at each step.

SUMMARY OF THE INVENTION

Generally speaking, the remotely controlled electric printer of characters having $m \times n$ horizontal and vertical squares or dots of equal dimensions comprises $n$ parallel adjacent horizontal print bars supported at their ends by springs for vertical or transverse movement to press a sheet of pressure sensitive paper against a movable anvil that steps along the bars in $m$ equal steps for each character. Each of the bars is moved vertically by a magnetic means which may comprise either separate electromagnets connected to each bar, or by placing the bars between the pole pieces of a magnetic and then selectively passing a relatively high current through the selected bar or bars so that it is repelled by the magnetic field between the pole pieces to press the paper against the anvil. The anvil preferably has a width equal to the part or bit $m$, and extends transversely across and above the print bars so as to bridge them. This anvil is mounted on a slide which may be guided along a track parallel to the print bars. Adjacent to this track are two parallel saw blade type of rulers, toothed bars or racks engagable by a pair of toothed pawls pivoted to the slide that supports the anvil. The pitch of the teeth of the pawls is less than the pitch of the teeth on the racks they engage. One of the racks is stationary while the other is reciprocable by an electromagnetic means so that the engagement of one of the pawls therein will cause the anvil and its slide to move a distance corresponding to the part $m$ of the character, and will be stopped by the pawl that engages the stationary rack. Thus a step-by-step movement is provided by each of the impulses applied to the electromagnet that moves the reciprocable rack, and each step corresponds to one vertical row of bits $m$ that makes up each character, as well as the two normal $m$ width spacings between each character.

Thus in a preferred embodiment one of the sawblade-shaped racks is stationary, whereas the other is movable over a distance $p$ corresponding to one step length of the cross bridge or anvil, the tooth pitch on the racks being $qp$ and the pawls being provided with teeth having a pitch $tp$ ($q$ and $t$ being numbers that are prime to one another), the attachment of the pawls to the bridge leaving them so much play as to allow their teeth to be pushed past the teeth of the racks. Notwithstanding the small steps this construction is simple and strong.

Also a preferred embodiment is that the electromagnetic means consist in an arrangement in which the rulers or print bars are placed in a magnetic field and, when in operation, carry currents according to the $n$-bit groups. These print bars are preferably supported by springs forming part of the current path. Apart from the cross bridge or anvils and its reciprocable rack, the print bars form the only moving parts of the apparatus of this invention.

OBJECTS AND ADVANTAGES

Accordingly, it is an object of this invention to produce a simple, efficient, efective, quiet, fast operating, economic, strong, and durable electric printer mechanism.

Another object is to simplify the known remotely controlled electronic printer devices so that pre-setting is not necessary and the number of moving parts can be restricted to a minimum.

Another object is to provide such a printing device which is suited to act as a writing terminal in a telephone network in the "popular teleprinter" project.

Still another object is to produce such a printer which requires little or no maintenance, has a relatively light weight anvil, and contains a relatively small number of movable parts.

BRIEF DESCRIPTION OF THE VIEWS

The above mentioned and other features, objects and advantages, and a manner of obtaining them are described more specifically below by reference to embodiments of this invention shown in the accompanying drawings wherein:

FIG. 1 is a schematic top plan view of a part of the device of this invention showing the parallel print bars, the anvil and its moving mechanism above said bars;

FIG. 2 is a schematic perspective view of some of the print bars and the cross bridging anvil, and one embodiment of how the bars are mounted for vertical movement;

FIG. 3 is a schematic top view of the print bars as shown in FIG. 2 with their separate control magnets under the bars; and FIG. 4 is a schematic end view of FIG. 3;

FIG. 5 is an enlarged schematic side view of the cross bridge or anvil step-by-step drive mechanism comprising the two racks and the two toothed pawls, but for case of illustration the pawls are shown on opposite sides of their pivotal mounting instead of on the same side as shown in FIG. 1;

FIG. 6 is a schematic view of the end of the device shown in FIG. 1 showing the paper or printing medium sheet between the print bars and anvil bridge;

FIG. 7 is an enlarged view of a printed character made of $m \times n$ equal dots or squares printed on the paper by the simultaneous contact of the paper by one or more print bars and the anvil;

Figure 8:
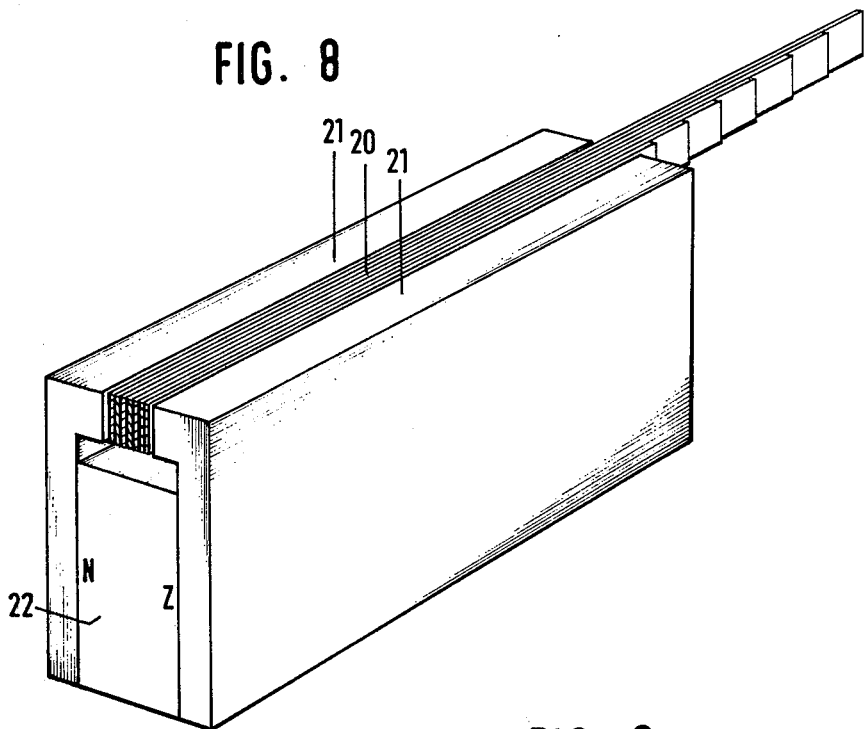
FIG. 8 is a schematic perspective view of another embodiment of a magnetic means for operating the print bars for the device shown in FIG. 1, instead of the mechanism shown in FIGS. 2, 3, and 4.
Figure 9:
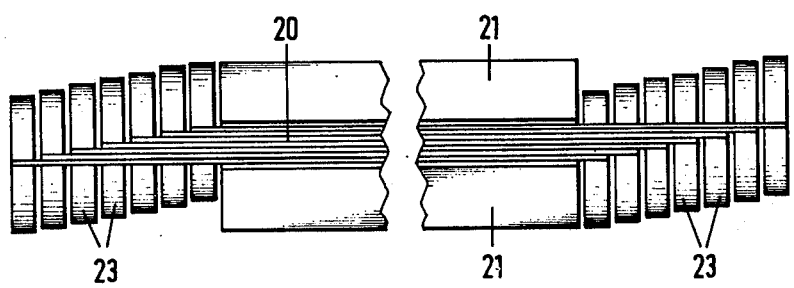
FIG. 9 is a top view of the device shown in FIG. 8 showing the S-shaped springs for supporting the ends of each print bar.
Figure 10:
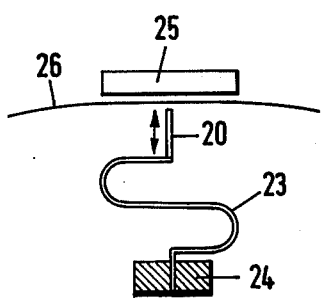
FIG. 10 is an end view of one of the print bars shown in FIG. 9 showing its supporting S-shaped spring, the anvil above the bar, and a sheet of paper between the anvil and bar.

Referring to FIGS. 1 and 8, the set of rulers or print bars 1 and 20, respectively, have a total thickness equal to the height $r$ of a line of characters to be printed along the length of said bars (FIG. 7). These bars cooperate with a cross bridge or anvil 2 or 25 which can be moved step by step along the bars, each of which bars can be moved upwards separately by electromagnetic means 12 (see FIGS. 3 and 4) or means 21, 22, 23, and 24 (see FIGS. 8, 9, and 10). The anvil bridge 2 is attached to a slide 3, which can move along a slide bar 4. The slide 3 supports a spindle 7 provided with two pawls 5 and 6. The pawls have teeth that co-operate with the teeth of two sawblade-shaped rulers or racks 8 and 9, of which the former rack 8 is stationary and the latter rack 9 can be moved by means of an electromagnet 10 and a compression spring 11 over a distance $p$ (FIG. 5).

FIG. 5 illustrates the principle of the cross bridge drive. For the sake of clearness the arrangement of the parts is different from that shown in FIG. 1, namely, the pawls are on opposite sides of their supporting pivot, shaft or spindle 7. The teeth of the pawls 5 and 6 have a pitch of $2p$, the tooth pitch of the rulers or racks 8 and 9 being $5p$. Instead of a pitch of $5p$, a pitch of $3p$ or $7p$ can be used. When the ruler or rack 9 is pushed to the left over a distance $p$, the pawl 6 is taken along by means of the tooth $a$, the tooth $b$ of pawl 5 being moved past the tooth $c$ of rack 8. When the rack 9 moves back, it slides past the teeth of pawl 6, which stays behind, because teeth $b$ and $c$ interlock. At the next step tooth $d$ pushes forward tooth $e$. This embodiment guarantees a good drive in small steps, whereas the teeth along the racks are relatively coarse and sturdy.

FIGS. 3 and 4 show the set of $n$ rulers or print bars 1, and the separate $n$ magnets 12 for ensuring their movement. An arm 14 attached to the armature 13 of each of the magnets 12 co-operates with a tongue 15 mounted to the lower edge of its associate bar 1. The vertical upward movement of each bar is checked by stops 16 (see FIG. 2). Draw or tension springs 17 may be provided at the lower edge of the bars to insure their retraction to their normal lower positions (FIG. 2).

The paper or sheet 18, on which the characters are to be printed, is fed between the print bars 1 and the anvil cross bridge 2 (FIG. 6) and this paper preferably is pressure-sensitive so that no ink ribbon is needed.

FIG. 7 shows a letter printed in five steps $p$. Between the steps the print bars 1 are actuated by pulses applied to the electromagnets 12, or through bars 20 (see FIGS. 8, 9, and 10) in accordance with the 7 or $n$-bit groups. The device according to the invention allows the printing of 10 characters per second of 5 steps each, which with spaces included of 2 steps each, amounts to a speed of about 72 steps per second.

In FIG. 8 a set of print bars 20 is placed between two pole shoes 21 of a permanent magnet 22. These bars 20 may be supported at their ends by curved or S-shaped springs 23 (FIG. 9) mounted to the terminals 24 via which current is supplied to the bars to cause them to be separately repelled by the field between the magnetic poles 21 and moved upwardly to push the paper 26 into contact with the anvil 25 (see FIG. 10). In the correctly operating prototype of this embodiment, the current in the rulers was 25 amperes and the voltage across them 1 volt. The $n$-bit groups received by the printer are transformed into the low voltages required to obtain the strong currents. If current is fed to one ruler and not to the adjoining ones, the adjoining bars will generally form a parallel path for the current, because the bars are in contact with each other and are not insulated. Nevertheless, it has been found that the current through the adjoining rulers is of the order of 3 amperes at the most, so that these rulers remain in their place. The rulers carrying a current of 25 amperes strike the paper 26 against a movable cross bridge anvil 25, against the action of the springs 23. Said paper 26, which is preferably pressure-sensitive, moves between the bars 20 and the anvil bridge 25 in order to receive the character impressions.

While there is described above the principles of this invention in connection with specific apparati, it is to be clearly understood that this description is made only by way of example and not as a limitation to the scope of this invention.

What is claimed is:

1. An electric printer of characters each of which characters is composed of spots marked in $m$ horizontal and $n$ vertical equal areas, said printer comprising:
   A. $n$ parallel adjacent print bars having lengths at least equal to the length of a line of said characters,
   B. anvil bridge means movable along said bars and spaced from and transverse of said bars,
   C. a printable sheet in the space between said anvil means and said bars for recording simultaneous contact between said bars and said anvil means,
   D. first electromagnetic means for separately moving said bars towards said anvil means, and
   E. second electromagnetic means for stepping said anvil means along said bars in increments corresponding to each $m$ area of said characters.

2. A printer according to claim 1 wherein said first electromagnetic means comprises a separate electromagnet for moving each of said bars.

3. A printer according to claim 1 wherein said first electromagnetic means comprises a magnetic field in which said parallel bars are located, and separate current conducting connections to each of said bars.

4. A printer according to claim 1 wherein said bars are connected to spring means at their ends.

5. A printer according to claim 1 wherein said second electromagnetic means comprises a pair of racks and a cooperating pair of toothed pawls.

6. A printer according to claim 5 wherein one of said racks is stationary and the other of said racks is movable, and said pawls are connected to said anvil means.

7. Printer according to claim 6 wherein said other rack is movable over a distance $p$ corresponding to one step length of the anvil bridge means, the tooth pitch on the rack being $pq$ and the pawls being provided with teeth having a pitch $tp$, $q$ and $t$ being numbers that are prime to one another.

* * * * *